United States Patent
Schweininger et al.

(10) Patent No.: US 9,296,138 B2
(45) Date of Patent: Mar. 29, 2016

(54) INJECTION-MOULDING MACHINE

(75) Inventors: Stefan Schweininger, Wiesbaden (DE); Christian Wagner, Mainz (DE)

(73) Assignee: MHT MOLD & HOTRUNNER TECHNOLOGY AG, Hocheim (DE)

(*) Notice: Subject to any disclaimer, the term of this patent is extended or adjusted under 35 U.S.C. 154(b) by 52 days.

(21) Appl. No.: 13/978,783

(22) PCT Filed: Jan. 2, 2012

(86) PCT No.: PCT/EP2012/050007
§ 371 (c)(1),
(2), (4) Date: Jul. 9, 2013

(87) PCT Pub. No.: WO2012/095326
PCT Pub. Date: Jul. 19, 2012

(65) Prior Publication Data
US 2013/0287886 A1    Oct. 31, 2013

(30) Foreign Application Priority Data
Jan. 12, 2011   (DE) .......................... 10 2011 002 585

(51) Int. Cl.
B29C 45/17    (2006.01)
B29C 45/03    (2006.01)
B29C 45/28    (2006.01)

(52) U.S. Cl.
CPC ............... B29C 45/17 (2013.01); B29C 45/03 (2013.01); B29C 45/281 (2013.01)

(58) Field of Classification Search
CPC ...... B29C 45/03; B29C 45/17; B29C 45/281; B29C 2045/2813; B29C 2045/2817; B29C 2045/2889

USPC .......................................................... 425/562
See application file for complete search history.

(56) References Cited

U.S. PATENT DOCUMENTS

| | | | |
|---|---|---|---|
| 3,491,408 A * | 1/1970 | Natkins Ephraim .......... | 425/563 |
| 4,173,448 A * | 11/1979 | Rees et al. .................... | 425/549 |
| 4,682,945 A * | 7/1987 | Schad ........................... | 425/549 |
| 5,635,227 A * | 6/1997 | Whisenhunt et al. ......... | 425/562 |
| 6,309,208 B1 * | 10/2001 | Kazmer et al. ................ | 425/562 |
| 6,328,554 B1 * | 12/2001 | Lausenhammer et al. .... | 425/564 |

(Continued)

FOREIGN PATENT DOCUMENTS

| DE | 4034934 A1 | 5/1992 |
|---|---|---|
| DE | 20118609 U1 | 2/2002 |

(Continued)

*Primary Examiner* — Yogendra Gupta
*Assistant Examiner* — Emmanuel S Luk
(74) *Attorney, Agent, or Firm* — Paul & Paul (57) ABSTRACT

An injection-molding machine comprising a hot runner, arranged in a manifold, for feeding a melt into a mold, a shut-off needle for optionally closing or opening the hot runner, a piston connected to the needle, is arranged in a housing with an opening and to which a fluid can be applied from both sides, and a covering plate having two fluid feeds, into the opening wherein the covering plate, the hot runner manifold and the housing are arranged in such a way that, at a first temperature of the manifold, a distance remains between the housing and the covering plate and, at a second higher temperature the thermal expansion of the manifold and/or housing causes the housing to come into contact with the covering plate, closing the opening. In a further embodiment, a flexible seal is provided between the housing and the covering plate.

20 Claims, 6 Drawing Sheets

(56) References Cited

U.S. PATENT DOCUMENTS

| | | |
|---|---|---|
| 6,343,925 B1 | 2/2002 | Jenko |
| 2003/0017225 A1* | 1/2003 | Bazzo et al. ............... 425/170 |
| 2003/0099735 A1* | 5/2003 | Yu ................................ 425/145 |
| 2004/0056225 A1* | 3/2004 | Novo et al. ................. 251/63.6 |
| 2004/0076710 A1* | 4/2004 | Schreck ....................... 425/564 |
| 2004/0115295 A1* | 6/2004 | Schunck et al. ............ 425/144 |
| 2006/0065991 A1* | 3/2006 | Tabassi et al. .............. 264/40.5 |
| 2009/0159828 A1* | 6/2009 | Esser ........................... 251/326 |
| 2010/0233311 A1* | 9/2010 | Tapuchievici ............... 425/563 |
| 2011/0027410 A1* | 2/2011 | Mohammed et al. ....... 425/564 |
| 2011/0241238 A1* | 10/2011 | Trakas ........................... 264/39 |
| 2012/0231108 A1* | 9/2012 | Wernz et al. ................ 425/547 |
| 2012/0248652 A1* | 10/2012 | Galati et al. ............ 264/328.12 |
| 2013/0147091 A1* | 6/2013 | Babin ...................... 264/328.15 |
| 2013/0316039 A1* | 11/2013 | Blais et al. .................... 425/549 |
| 2014/0035563 A1* | 2/2014 | Tan et al. .................... 324/207.2 |

FOREIGN PATENT DOCUMENTS

| | | |
|---|---|---|
| DE | 102005046770 A1 | 4/2006 |
| DE | 202009004786 U1 | 10/2010 |
| JP | 2008-213154 A1 | 2/2008 |
| WO | 0074920 A1 | 12/2000 |
| WO | 2009052611 A1 | 4/2009 |
| WO | 2011161590 A1 | 12/2011 |

* cited by examiner

INJECTION-MOULDING MACHINE

The present invention relates to an injection-moulding machine with a hot runner for feeding a plasticised melt into a mould. Here, a shut-off needle is provided for optionally closing or opening the hot runner, the shut-off needle being connected to a piston which is arranged in a housing with an opening and to which a fluid can be applied on both sides. With the aid of the fluid the piston and hence the shut-off needle connected to the piston can be moved inside the housing in order to close or open the hot runner in relation to the mould.

In addition a covering plate is provided which has two fluid feeds through which the fluid to be applied to the piston is fed into the opening of the housing. The covering plate closes the opening of the housing. One such injection-moulding machine is described in U.S. Pat. No. 4,173,448 for example.

In the form of embodiment shown the covering plate exhibits recesses into which the housing projects so that the housing is arranged partly inside the recess.

As the generally heated plasticised melt is fed through the hot runner, and the hot runner is arranged in a hot runner manifold which exhibits considerable expansion due to a large number of shut-off needles arranged therein each connected to a piston, the precise position of the shut-off needle in relation to the covering plate changes when the injection-moulding machine is set in operation due to the thermal expansion of the shut-off needle and hot runner manifold associated with the rise in temperature. Therefore, the covering plate, hot runner manifold and housing are arranged in such a way that at a first temperature of the hot runner manifold, as a rule ambient temperature, there is a gap between the housing and the covering plate, and at a second temperature of the hot runner manifold—as a rule the operating temperature—which is higher than the first temperature, the housing comes into contact with the covering plate due to the thermal expansion of the hot runner manifold and/or housing in such a way that the covering plate closes the opening of the housing. In other words, when in operation, due to the thermal expansion of the housing and the covering plate, the housing with its opening formed in the end face is pressed against the covering plate so that the covering plate closes the housing. Here, it is most important that the fluid feeds arranged in the covering plate line up with corresponding fluid channels in the housing in order to ensure that the fluid can be brought into contact with the piston on both sides if necessary. This form of embodiment has the disadvantage that when cold the covering plate does not come into contact with the housing and therefore control of the piston and hence the shut-off needle with the fluid is not possible.

Therefore the injection-moulding machine cannot be brought into operation until the hot runner manifold and the housing fastened to it has reached its operating temperature, as it is only then that the opening of the housing is closed by the covering plate and fluid can be fed in through the covering plate.

Therefore, in order to permit a control function at lower temperatures of the hot runner manifold, attempts have already been made to arrange the housing and covering plate in such a way that contact takes place between the housing and the covering plate at a temperature of the hot runner manifold which is well below the operating temperature so that control of the shut-off needle can take place at this lower temperature. However, as the hot runner manifold continues expanding until the operating temperature is reached, this leads to the covering plate and the housing exerting considerable forces on one another, which in certain circumstances can lead to tipping or tilting of the housing, through which the operation of the shut-off needle can be impaired.

As the hot runner manifold usually has a plurality of shut-off needles each of which close or open an opening in the hot runner to a mould, the expansion of the hot runner manifold perpendicular to the shut-off needle cannot be disregarded. This means that the housing and covering plate move relative to one another perpendicular to the needle axis due to the heating of the housing caused by the direct contact with the hot runner manifold until the operating temperature is reached.

However, if, as proposed at the start, metal-to-metal contact between the housing on the one hand and the covering plate on the other is already produced at a temperature well below the operating temperature of the hot runner manifold, the further heating of the hot runner manifold leads to bending (deformation) of the housing.

U.S. Pat. No. 6,343,925 shows another form of embodiment.

Departing from the prior art as described, the object of the present invention is therefore to provide an injection-moulding machine of the kind named initially which allows reliable operation of the shut-off needle at temperatures of the hot runner manifold below the operating temperature and also permits relative movement of the covering plate and the housing in a direction perpendicular to the needle axis without deformation of the housing, while enabling the force applied by the housing to the covering plate to be reduced in comparison with the forms of embodiment according to the prior art.

According to the invention, this object is achieved in that a flexible seal is provided between the housing and the covering plate, which seal is configured such that the covering plate closes the opening of the housing in a position in which the covering plate and the housing are a distance from one another.

In other words, the flexible seal ensures that the opening of the housing can be closed by the covering plate although the distance between the housing and the covering plate reduces further when the hot runner manifold and the housing are heated further.

The flexible seal also allows a relative movement to take place between the covering plate on the one hand and the housing on the other perpendicular to the needle axis as the flexible seal is able to slide on the surface of the covering plate or on the end of the housing to a limited degree. However, it should be ensured that the transfer of fluid between the covering plate and the housing is not interrupted.

In one preferred form of embodiment the housing and/or the covering plate exhibits a corresponding groove into which the flexible seal, e.g. an O-ring, can be fitted. In this case the flexible seal and the groove are best configured in such a way that on reaching the operating temperature the housing comes directly into contact with the covering plate so that in this situation the flexible seal no longer has to perform a sealing function.

In one preferred form of embodiment provision is made for two flexible seals to be provided between the housing and the covering plate, the two flexible seals being arranged in such a way that fluid can only be fed to the first side of the piston via the first fluid feed of the covering plate and fluid can only be fed to the second side of the piston via the second fluid feed of the covering plate.

In other words, the two flexible seals are arranged so that the first and the second fluid feed of the covering plate are separated from one another by one of the flexible seals.

For example, the flexible seals can be formed by two O-rings arranged concentrically with one another. The first fluid feed of the covering plate is then arranged for example in such a way that the fluid feed takes place inside the inner O-ring while the second fluid feed is arranged so that the fluid feed takes place between the inner O-ring and the outer O-ring.

In a further preferred form of embodiment provision is made for the housing to exhibit a detachable adapter element which has a fluid inlet opening and a fluid outlet opening which are arranged in such a way that the fluid provided by the covering plate is passed through the fluid inlet opening into the adapter element and through the fluid outlet opening of the adapter element into the housing. Furthermore, in a preferred form of embodiment the adapter element is arranged at least partly, preferably completely in the housing. Expediently the flexible seals are arranged on or in the adapter element. The adapter element allows better adjustment of the housing to the fluid outlets of the covering plate, through which the transfer of fluid is guaranteed even with a relative movement between the housing and the covering plate perpendicular to the axis of the shut-off needle.

In a further preferred form of embodiment provision is made for the adapter element and the housing to exhibit corresponding stop faces which come into contact with one another when the adapter element is inserted in the housing. These stop faces allow the adapter element to be positioned precisely inside the housing easily while at the same time ensuring that the chambers which can be filled with fluid formed on both sides of the piston have the correct effective piston area.

It is also expedient if the adapter element exhibits a piston stop face which is arranged in such a way that the piston bears on the piston stop face in one of its maximum positions. The piston is moved backwards and forwards inside the housing by the application of the fluid to both sides of the piston, through which the shut-off needle can be moved from the open position to the closed position. The piston stop face ensures that sufficient space is also left between the piston on the one hand and the adapter element or covering plate on the other in the piston position in which the piston is closest to the adapter element so that the effective area to which the fluid can be applied does not drop below a minimum amount.

In a further preferred form of embodiment provision is made for the fluid inlet opening and the fluid outlet opening of the adapter element to differ in their cross-section and/or to be different distances from the axis of the shut-off needle.

In other words, in this case the adapter element serves to adjust the fluid outlet openings of the covering plate to the corresponding fluid inlet positions of the housing.

In a further preferred form of embodiment provision is made for the fluid outlet opening of the adapter element to be arranged in the stop face and for the housing to exhibit a fluid channel one end of which is arranged in the stop face of the housing.

This measure allows effective further conveyance of the fluid from the covering plate into the functional space of the piston remote from the covering plate.

Figure 1:
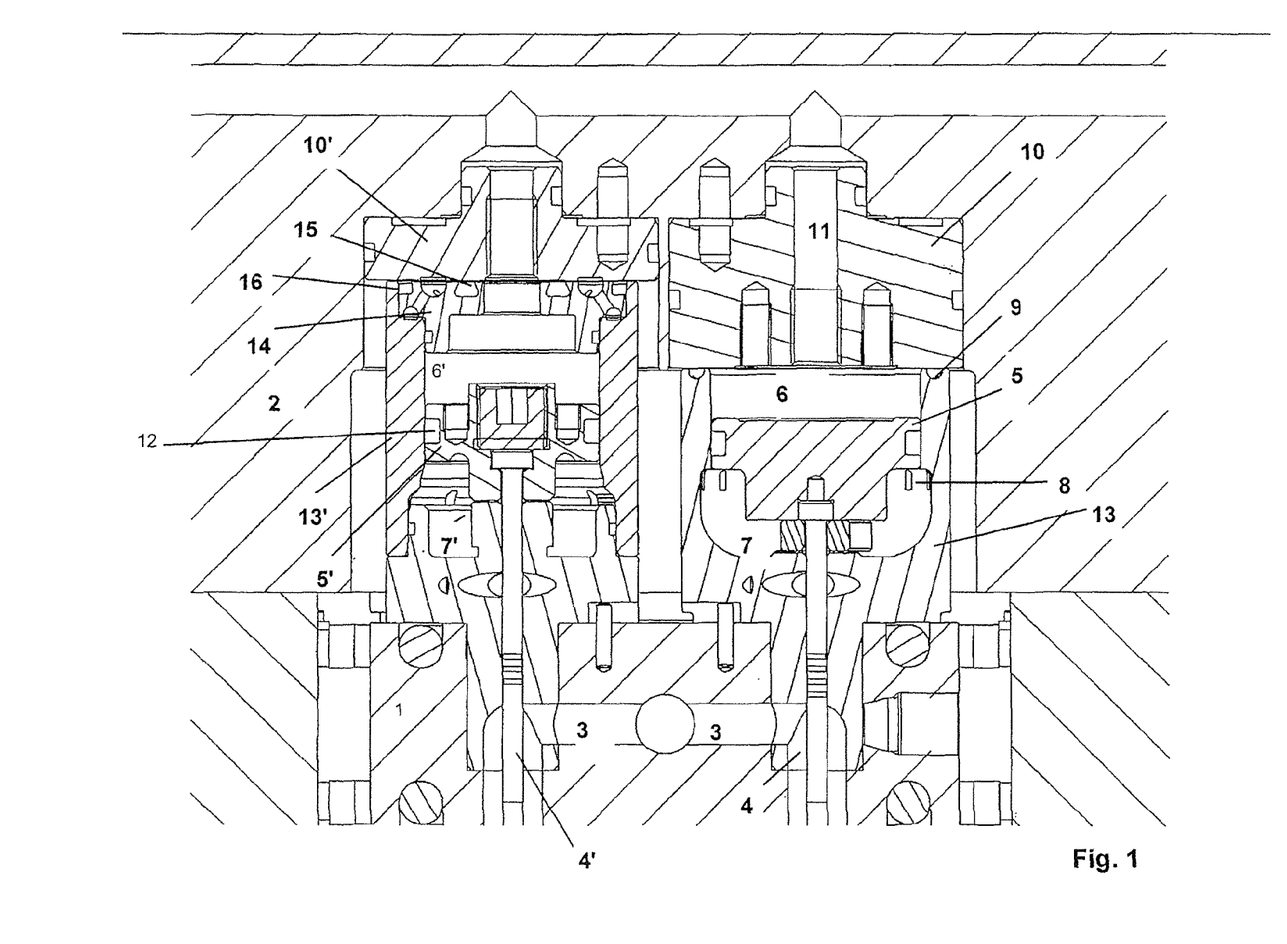
FIG. 1 shows a comparison of a form of embodiment according to the prior art and a first form of embodiment of the invention.

Further advantages, features and possible applications of the present invention will become apparent from the following description of a few preferred forms of embodiment and the associated figures in which:

FIG. 1 shows a sectional view through two piston housings arranged next to one another, the form of embodiment arranged on the right in FIG. 1 being a form of embodiment according to the prior art while the form of embodiment arranged on the left in FIG. 1 is a first form of embodiment of the invention.

The form of embodiment shown on the right in FIG. 1 comprises the hot runner manifold 1 with a hot runner 3 for plasticised melt. The plasticised melt is fed into the mould through this runner. The inlet into the mould can be closed or opened with the aid of the shut-off needle 4. For movement of the shut-off needle 4 the needle is connected to a piston 5 which is arranged inside a housing 13. The housing 13 is open at the top and is closed by a covering element 10 which is connected to the covering plate 2. The piston 5 divides the space located inside the housing 13 into two part spaces 6, 7 both of which can optionally be supplied with a fluid, i.e. placed under pressure as required.

If for example fluid is introduced into the housing 13 through the feed channel 11, the pressure in the part space 6 is increased so that the piston 5 moves into the position shown on the right in FIG. 1. In this position the shut-off needle 4 closes the inlet to the mould. To move the piston 5 upwards and thus move the shut-off needle into the open position, fluid must be introduced into the housing 13 through the fluid inlet 9 through the covering element 10. The fluid inlet 9 of the housing 13 is connected through a channel inside the wall (not visible in the figure) to the fluid outlet 8 which is located inside the lower part space 7. Therefore, if fluid is fed through this fluid channel, the pressure in the lower part space 7 is increased, and the piston 5 moves upwards in FIG. 1, through which the part space 6 is reduced in size until the piston 5 bears on the covering element 10.

When in operation, extreme temperature differences prevail in the illustrated tool. Whereas the hot runner manifold 1 in which the plasticised heated melt is fed works at a high temperature (greater than 250° C.), the covering plate 2 is usually cooled and therefore at a much lower temperature (approx. 20° C.).

Given the high differences in temperature, allowance must be made for the thermal expansion of the individual elements. Consequently, the dimensions of the housing 13 are selected such that it does not come into contact with the covering element 10 when cold, i.e. when the hot runner manifold 1 and housing 13 have not reached operating temperature. In this situation the covering element 10 therefore cannot close the housing 13, and the shut-off needle 4 cannot be controlled by feeding fluid. Therefore, before the beginning of the injection moulding operation, the hot runner manifold 1 must be heated. This causes the material to expand and the gap between the housing 13 on the one hand and the covering element 10 on the other reduces until the housing 13 is sitting on the covering element 10 and pressed against it. As a result of this, the opening of the housing 13 is closed by the covering element 10. In this state the piston 5 and hence the shut-off needle 4 can be controlled by suitable fluid control through the covering element 10.

To allow control of the shut-off needle 4 at temperatures below the final operating temperature, the housing 13 is designed in such a way that it comes into contact with the covering element 10 at a temperature well below the operating temperature. So when the hot runner manifold 1 is heated further to operating temperature, the housing 13 is pressed against the covering element 10 with great force. Therefore considerable forces must be managed.

As usually a whole series of shut-off needles are arranged next to one another inside the hot runner manifold 1, the expansion of the hot runner manifold 1 in the transverse direction, i.e. transversely to the axis of the shut-off needles, also plays a part so that in certain circumstances deformation of the housing 13 can occur when the housing 13 has already come into contact with the covering element 10 and relative movement takes place between the housing 13 and the covering element 10 as a result of further heating of the hot runner manifold 1.

A first form of embodiment of the invention is shown in the view shown on the left in FIG. 1. Here as well a piston 5' connected to a shut-off needle 4' is guided inside a housing 13' which divides the hollow space inside the housing 13' into two part spaces 6' and 7'. To seal the two part spaces the piston exhibits a circumferential groove 12 into which a seal can be fitted.

Each of the two part spaces 6' and 7' can be fed with a fluid, i.e. placed under pressure according to choice so as to cause the piston 5' to move upwards or downwards inside the housing 13' in order to move the shut-off needle 4' from its open position to its closed position and back again.

Here the housing 13' exhibits an adapter element 14 which partly closes the opening of the housing 13'. This adapter element 14 exhibits an inner essentially circular groove 15 and an outer essentially circular groove 16. A flexible seal, in the present case an O-ring, is fitted into these grooves (not shown). This seal protrudes beyond the side of the adapter element 14 remote from the piston 5' so it provides a seal between the adapter element 14 on the one hand and the covering element 10' on the other, even when the adapter element 14 and the covering element 10' are still not touching. Therefore this measure provides a seal between the housing and the covering element at temperatures well below the operating temperature so that effective control of the shut-off needle 4' is possible. At the latest when the operating temperature of the hot runner manifold 1 is reached, the housing 13' has expanded so that it comes into contact with the covering element 10'. In this situation, which is shown in FIG. 1, the flexible seals fitted into the grooves 15 and 16 no longer play any part in the sealing function.

Figure 2:
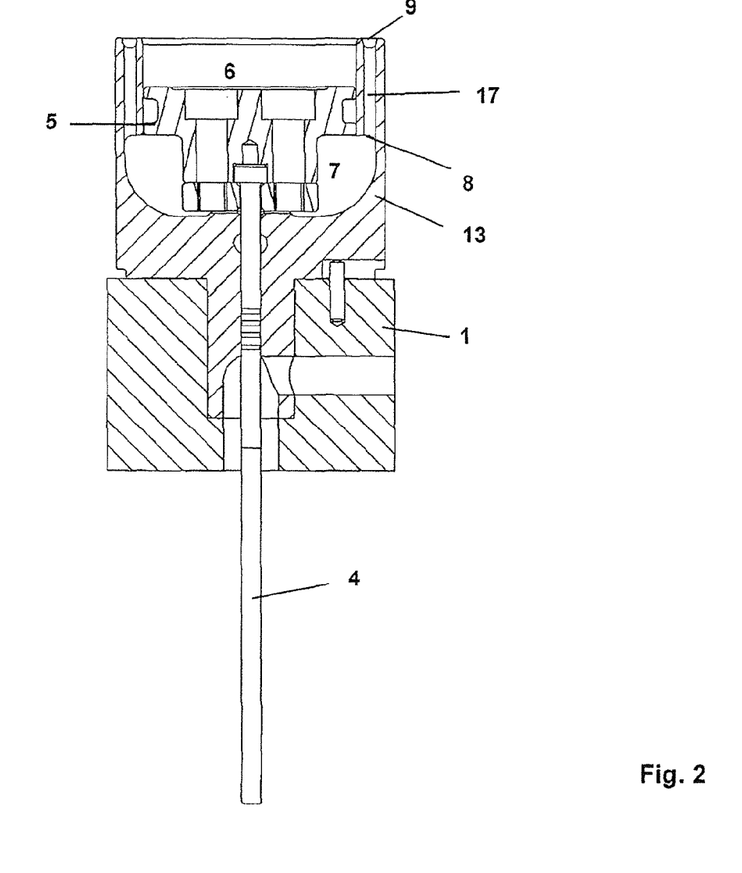
FIG. 2 shows a sectional view of the piston housing with the piston inserted in the form of embodiment according to the prior art.

FIG. 2 shows a further sectional view of the form of embodiment according to the prior art. In this illustration the channel 17 which connects the fluid inlet 9 to the fluid outlet 8 is clearly visible. Through this fluid channel 17 the fluid can be passed into the lower chamber 7 in order to place this chamber under pressure and move the piston 5 upwards.

Figure 3:
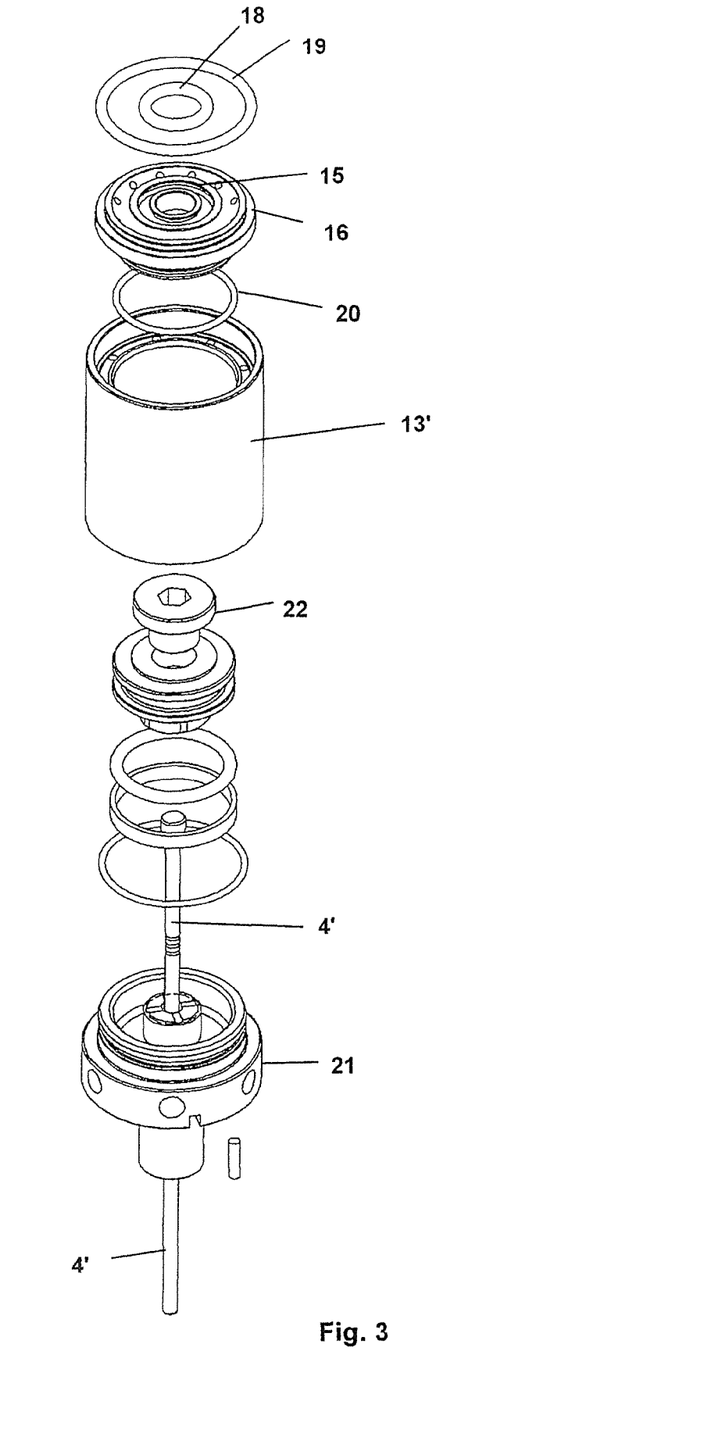
FIG. 3 shows an exploded view of the first form of embodiment of the invention.

FIG. 3 shows an exploded view of the first form of embodiment of the invention. The concentrically arranged O-ring seals 18 and 19 which are fitted into the corresponding grooves 15 and 16 of the adapter element 14 are clearly visible. The adapter element 14 is sealed in relation to the housing 13' with the aid of the O-ring seal 20.

The housing 13' exhibits a bottom 21 in which the shut-off needle 4' is fixed by the screw 22.

Figure 4A:
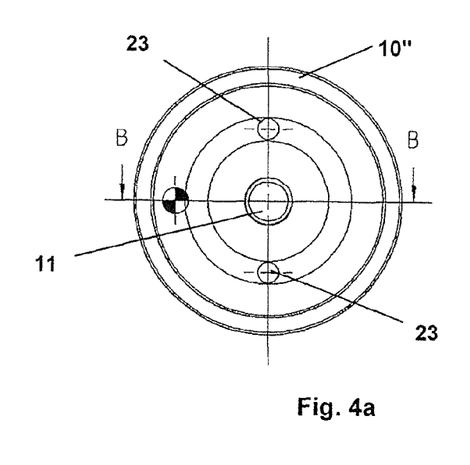
FIGS. 4a to 4c show different views of a second form of embodiment of the invention.
Figure 4B:
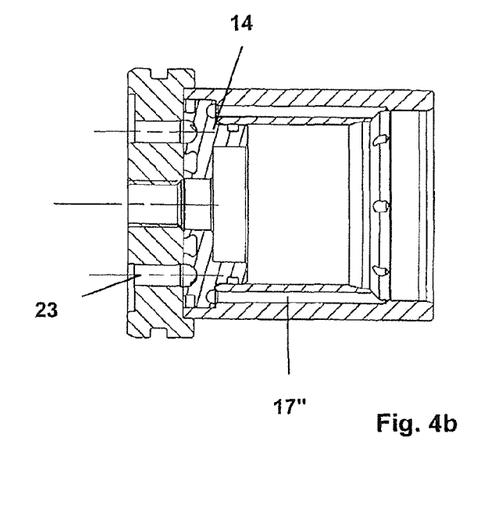
Figure 4C:
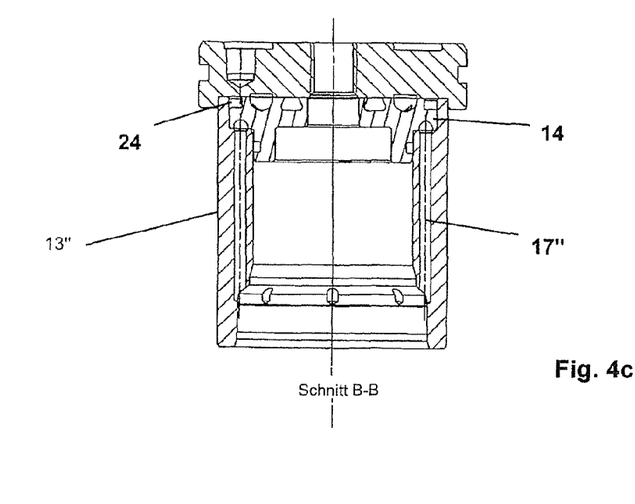

FIGS. 4a to 4c show three views of a second form of embodiment of the invention. FIG. 4a shows a plan view from above of the covering element 10" which is arranged above the piston housing. The covering element 10" exhibits a central fluid feed 11 and two decentral fluid feeds 23. As can be seen in particular in the sectional view in FIG. 4b, in the form of embodiment according to the invention the outer fluid feeds 23 can be designed with a greater cross-section than the corresponding fluid channels 17" in the housing 13". Therefore, the stream of fluid fed through the channels 23 is firstly guided axially outwards into the channel 17" with the aid of the adapter element 14, and secondly the cross-section is tapered. In the second form of embodiment shown in FIGS. 4a to 4c the covering element 10" exhibits a circular bead 24 which engages in corresponding recesses of the adapter element 14 in order to fix the radial position (in relation to the shut-off needle axis) of the housing in relation to the covering element 10".

Figure 5A:
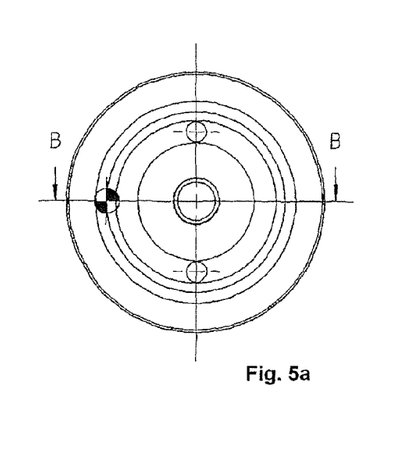
FIGS. 5a to 5c show different views of a third form of embodiment of the invention.
Figure 5B:
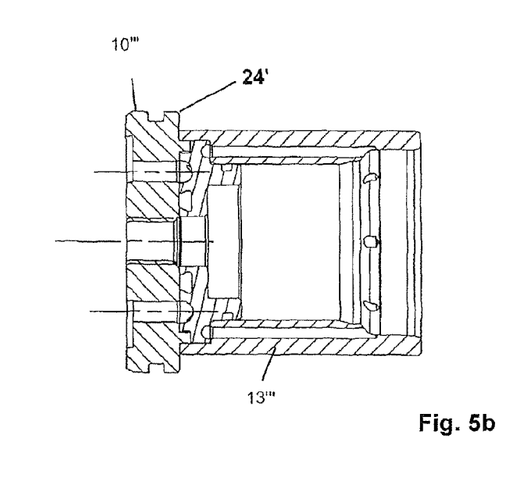
Figure 5C:
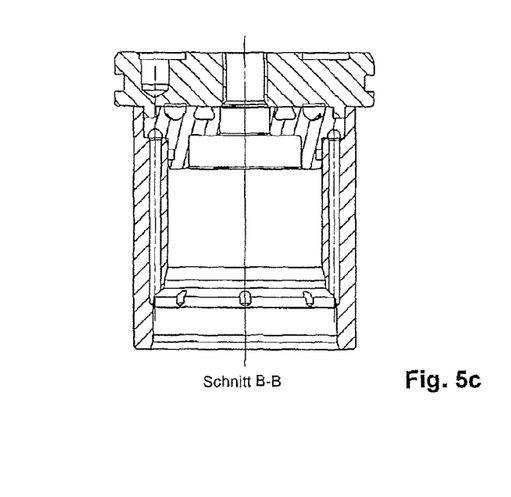

FIGS. 5a to 5c show a third form of embodiment of the invention. Here the circular bead 24' of the covering element 10'" is mounted in such a way that it grips around the housing 13'".

Figure 6:
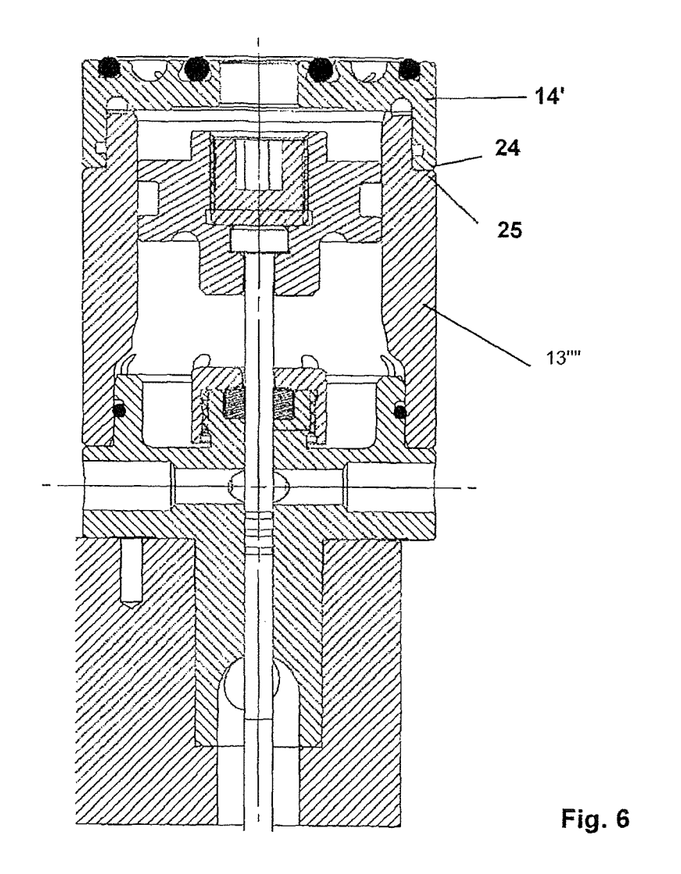
FIG. 6 shows a sectional view of a fourth form of embodiment of the invention.

Finally, FIG. 6 shows a fourth form of embodiment of the invention. Here the adapter element 14' grips around the housing 13"" which exhibits a tapered outside diameter in the end facing the adapter element 14'. At its end facing the housing 13"" the adapter element 14' exhibits a stop face 24. The housing 13"" also exhibits a corresponding stop face 25 at its end facing the adapter element 14'. This stop face positions the adapter element 14' precisely relative to the housing 13"".

LIST OF REFERENCE NUMBERS

1 Hot runner manifold
2 Covering plate
3 Feed channel (hot runner)
4, 4' Shut-off needle
5, 5' Piston
6, 7, 6', 7' Part space, chamber
8 Fluid outlet
9 Fluid inlet
10, 10', 10" Covering element
11 Feed channel
12 Groove
13, 13', 13", 13'" Housing
14, 14' Adapter element
15 Groove
16 Groove
17, 17' Fluid channels
18 O-ring seal
19 O-ring seal
20 O-ring seal
21 Bottom
22 Screw
23 Fluid feed
24, 24' Circular bead, stop face
25 Stop face

The invention claimed is:
1. An injection-moulding machine comprising:
a hot runner arranged in a hot runner manifold for feeding a plasticised melt into a mould;
a shut-off needle for optionally closing or opening the hot runner;
a piston which is connected to the shut-off needle and arranged in a housing, said housing having a top with at least one opening, wherein said piston has two sides and a fluid can be selectively applied to either of said two sides of said piston;

a covering plate with at least two fluid feeds, wherein the fluid to be applied to each of said two sides of the piston is fed through at least a respective one of said at least two fluid feeds of said covering plate;

said covering plate, said hot runner manifold, and said housing being arranged in such a way that at a first temperature of the hot runner manifold a gap is left between said housing and said covering plate, and at a second temperature of the hot runner manifold which is higher than the first temperature, said housing comes into contact with said covering plate in such a way that said covering plate closes the opening of said housing due to the thermal expansion of at least one of said hot runner manifold and said housing; and two flexible seals provided between the housing and the covering plate, the two flexible seals being arranged in such a way that fluid can be fed to a first of said two sides of the piston through a first of said at least two fluid feeds of the covering plate and fluid can be fed to a second of said two sides of the piston through a second of said at least two fluid feeds of the covering plate, said flexible seals being configured in such a way that each of said flexible seals closes the opening of the housing against leakage of the fluid fed through at least one of said at least two fluid feeds of said covering plate when the covering plate and the housing are a distance from one another.

2. The injection-moulding machine according to claim 1, wherein the flexible seals are formed by two O-rings arranged concentrically with one another.

3. The injection-moulding machine according to any one of claims 1 and 2, wherein the housing exhibits a detachable adapter element which has at least one fluid inlet opening and at least one fluid outlet opening which are arranged in such a way that the fluid provided by the covering plate is passed through the fluid inlet opening into the adapter element and through the fluid outlet opening of the adapter element into the housing.

4. The injection-moulding machine according to claim 3, wherein the adapter element is arranged at least partly, in the housing.

5. The injection-moulding machine according to claim 3, wherein the adapter element and the housing exhibit corresponding stop faces which come into contact with one another when the adapter element is inserted in the housing.

6. The injection-moulding machine according to claim 3, wherein the adapter element exhibits a piston stop face which is arranged in such a way that the piston bears on the piston stop face in one of its maximum positions.

7. The injection-moulding machine according to claim 3, wherein the fluid inlet opening and the fluid outlet opening differ in their cross-section and are different distances from the axis of the shut-off needle.

8. The injection-moulding machine according to claim 5, wherein the fluid inlet opening and the fluid outlet opening differ in their cross-section and are different distances from the axis of the shut-off needle and wherein the fluid outlet opening of the adapter element is arranged in the stop face of said adapter element and wherein the housing exhibits a fluid channel one end of which is arranged in the stop face of the housing.

9. The injection-moulding machine according to claim 4, wherein the adapter element is arranged completely in the housing.

10. The injection-moulding machine according to claim 3, wherein the fluid inlet opening and the fluid outlet opening differ in their cross-section or are different distances from the axis of the shut-off needle.

11. The injection-moulding machine according to claim 5, wherein the fluid inlet opening and the fluid outlet opening differ in their cross-section or are different distances from the axis of the shut-off needle and wherein the fluid outlet opening of the adapter element is arranged in the stop face of said adapter element and wherein the housing exhibits a fluid channel one end of which is arranged in the stop face of the housing.

12. An injection-moulding machine comprising:

a hot runner arranged in a hot runner manifold for feeding a plasticised melt into a mould;

a shut-off needle for optionally closing or opening the hot runner;

a piston which is connected to the shut-off needle and arranged in a housing, said housing having a top with at least one opening, wherein said piston has two sides and a fluid can be selectively applied to either of said two sides of said piston;

a covering plate with at least two fluid feeds, wherein the fluid to be applied to each of said two sides of the piston is fed through at least a respective one of said at least two fluid feeds of said covering plate;

said covering plate, said hot runner manifold, and said housing being arranged in such a way that at a first temperature of the hot runner manifold a gap is left between said housing and said covering plate, and at a second temperature of the hot runner manifold which is higher than the first temperature, said housing comes into contact with said covering plate in such a way that said covering plate closes the opening of said housing due to the thermal expansion of at least one of said hot runner manifold and said housing; and a flexible seal provided between the housing and the covering plate, said flexible seal being configured in such a way that said flexible seal closes the opening of the housing against leakage of the fluid fed through at least one of said at least two fluid feeds of said covering plate when the covering plate and the housing are a distance from one another, wherein the housing exhibits a detachable adapter element which has at least one fluid inlet opening and at least one fluid outlet opening which are arranged in such a way that the fluid provided by the covering plate is passed through the fluid inlet opening into the adapter element and through the fluid outlet opening of the adapter element into the housing.

13. The injection-moulding machine according to claim 12, wherein the adapter element is arranged at least partly, in the housing.

14. The injection-moulding machine according to claim 12, wherein the adapter element and the housing exhibit corresponding stop faces which come into contact with one another when the adapter element is inserted in the housing.

15. The injection-moulding machine according to claim 12, wherein the adapter element exhibits a piston stop face which is arranged in such a way that the piston bears on the piston stop face in one of its maximum positions.

16. The injection-moulding machine according to claim 12, wherein the fluid inlet opening and the fluid outlet opening differ in their cross-section and are different distances from the axis of the shut-off needle.

17. The injection-moulding machine according to claim 14, wherein the fluid inlet opening and the fluid outlet opening differ in their cross-section and are different distances from the axis of the shut-off needle and wherein the fluid outlet opening of the adapter element is arranged in the stop face of said adapter element and wherein the housing exhibits a fluid channel one end of which is arranged in the stop face of the housing.

18. The injection-moulding machine according to claim 13, wherein the adapter element is arranged completely in the housing.

19. The injection-moulding machine according to claim 12, wherein the fluid inlet opening and the fluid outlet opening differ in their cross-section or are different distances from the axis of the shut-off needle.

20. The injection-moulding machine according to claim 14, wherein the fluid inlet opening and the fluid outlet opening differ in their cross-section or are different distances from the axis of the shut-off needle and wherein the fluid outlet opening of the adapter element is arranged in the stop face of said adapter element and wherein the housing exhibits a fluid channel one end of which is arranged in the stop face of the housing.

\* \* \* \* \*